United States Patent [19]

Andersson

[11] 4,240,060
[45] Dec. 16, 1980

[54] METHOD AND DEVICE FOR SWITCHING-OFF A SUPERVISION SYSTEM

[75] Inventor: Lars-Goran T. Andersson, Järfällu, Sweden

[73] Assignee: U.S. Philips Corporation, New York, N.Y.

[21] Appl. No.: 754,895

[22] Filed: Dec. 27, 1976

[30] Foreign Application Priority Data

Dec. 29, 1975 [SE] Sweden .................................. 7514653

[51] Int. Cl.³ ............................................ G08B 29/00
[52] U.S. Cl. ........................................ 340/47; 340/53; 340/506; 318/565; 307/112
[58] Field of Search .................... 340/47, 409, 48, 53, 340/500, 501, 506, 508, 531; 318/565; 307/112, 139, 141, 142

[56] References Cited

U.S. PATENT DOCUMENTS

| 2,662,207 | 12/1953 | Hollister | 318/626 |
| 2,673,974 | 3/1954 | Beauchemin | 340/48 |
| 3,953,831 | 4/1976 | Estrada | 340/279 |

*Primary Examiner*—John W. Caldwell, Sr.
*Assistant Examiner*—Donnie L. Crosland
*Attorney, Agent, or Firm*—T. A. Briody; W. J. Streeter; Bernard Franzblau

[57] ABSTRACT

A method of and a device for switching-off a supervision system, e.g. a system for supervising the speed of a train. It must be possible to switch off the supervision system, but only when a predetermined pattern of operations are followed. This is achieved by using a time control activation current loop to briefly operate a contact device by means of first and second operating members in combination with a time independent activation current loop that holds the contact device closed provided the predetermined pattern of operations is followed.

10 Claims, 1 Drawing Figure

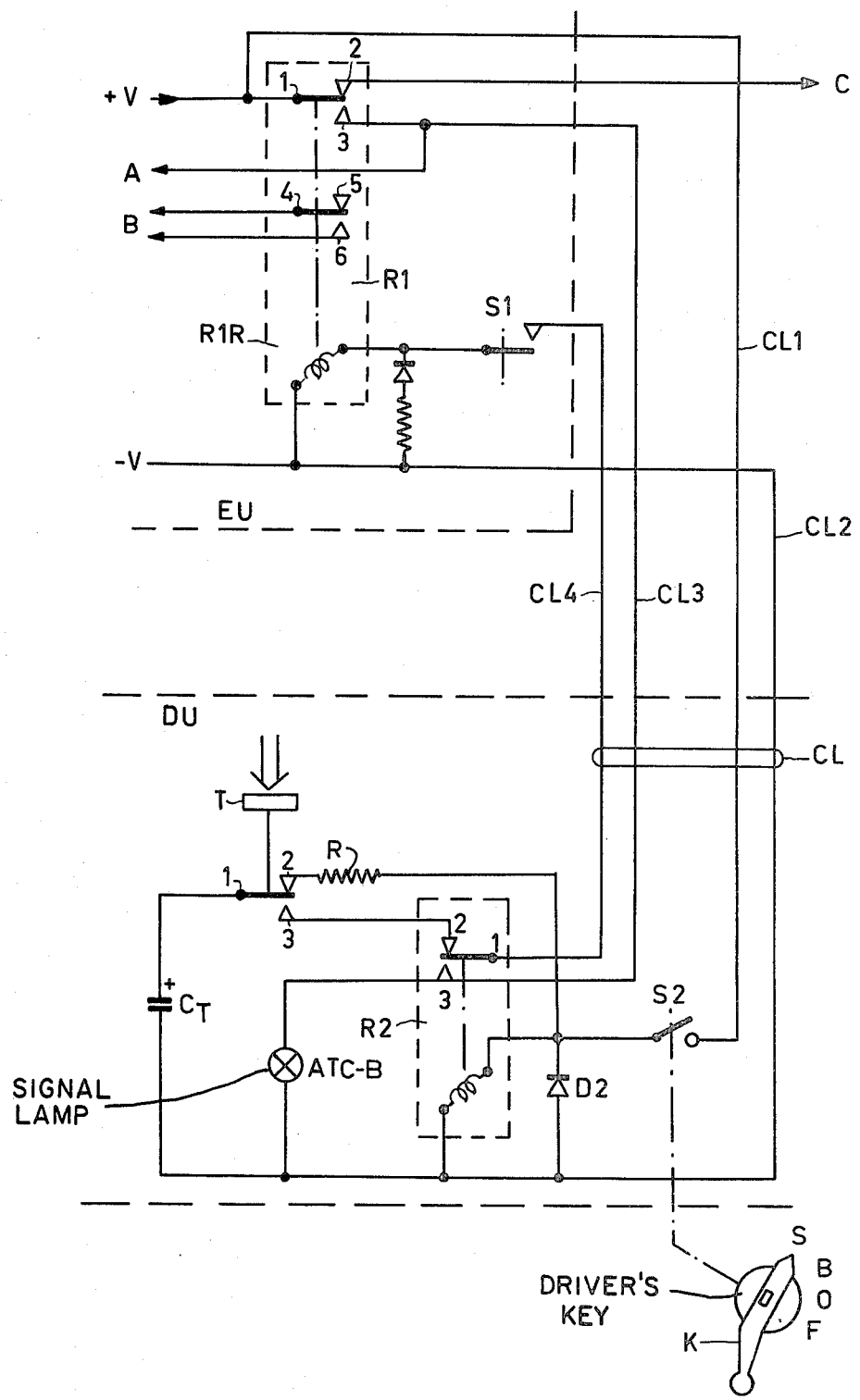

METHOD AND DEVICE FOR SWITCHING-OFF A SUPERVISION SYSTEM

The invention is directed to a method for switching-off a supervision system arranged for electronic processing of supervision information supplied thereto with respect to the operating condition of an arrangement and to initiate, dependent on the result of said processing, one or more pre-determined supervision functions by influencing the operating condition, of control current loops provided with a contact device which is connected to operating members by means of which the contact device is activated to block said supervision functions. The invention is further directed to a device for carrying out the method.

The method and device according to the invention may be used in various devices where a supervision or monitoring system of the type disclosed is used, but for the sake of clarity the following description will be directed to the use of the invention for switching-off a velocity supervision system provided on a train and the problems attendant therewith.

Such a velocity supervision system is essentially composed of an electronic unit, which for example may be provided in the engine house of the locomotive, and one or two, alternatively, display units provided in the driver's cabin (cabins) of the locomotive. Said electronic unit of such a system may among other things, comprise a micro-processor whose the task to evaluate the supervision information and to control the communication of data between the electronic unit and the display unit. The electronic unit should be controlled by the driver. Therefore, in order to provde a communication link between the electronic unit and the driver said display unit may be provided with push buttons, indication lamps and digital indicators. The micro-processor may be arranged for sensing the positions of said push buttons, turning on and off said indication lamps, and so on.

For security reasons a system of this type is also provided with some kind of a checking unit in order to check continuously the function of the supervision system and to initiate a forced retardation of the train when an error is detected. In the event of such a forced retardation of the train the current feed to the engines of the train is also broken. Therefore it is desirable that the supervision system may be switched-off in one way or another when an error of this kind arises, since otherwise the train may not be moved.

The switching-off of the supervision system must necessarily fulfill very rigorous requirements with respect to security in order to eliminate possible serious sources of error. In order to achieve this end the following requirements should be fulfilled:

1. Switching-off must be possible only when the train is not moving;
2. Switching-off must not be carried out by mistake;
3. The circuit device must be provided with some kind of automatic replacement of the device to an initial position so that the supervision system may not be "forgotten" in a switched-off position;
4. The circuit device must be of a shape such that the possibility of it being switched-off by malicious external actions is eliminated to the utmost possible extent;
5. Switching-off must be impossible when the supervision system functions normally.

Different technical solutions which approximately fulfill the fundamental requirement 1 are possible.

Thus it is possible to use the above-mentioned micro-processor of the electronic unit. The micro-processor is normally used to block operation members of the display unit when the train is moving. Likewise the micro-processor might be used so as to make it impossible to switch-off of the supervision system when the train is moving. Such a solution is, however, not satisfactory since one possible reason for switching-off the system is an apparent error of the micro-processor and the associated circuits.

One further possibility is to use an ordinary current switch which is so positioned that the driver must necessarily leave the driver's stand in order to operate the same, which will thereby eliminate the possibility of operating the current switch when the train is moving. This solution brings with it a risk that the system is left in a switched-off condition. An improvement, at least to some extent, may be achieved by the use of a current switch which is replaced automatically when any regular operation is carried out by the driver, e.g. braking a main current switch, before leaving the driver's cabin or the locomotive. However, an important risk of a mistake will remain and furthermore such a solution will not fulfill the further requirements numbered 2-5.

A basic idea behind the invention is, with respect to the requirements 2 and 4 above, that the switching-off method and the circuit device used therefor should be of a type such that in order for anyone to carry out the switching-off he must have knowledge of a given pattern of operations and the function of the circuit device.

This is achieved by a method which according to the invention is characterized in that a time controlled activation current loop provided for a temporary activation of the contact device is closed during a pre-determined period of time by moving a first operating member from a first to a second position and by keeping the same in this position while a second operating member is in a first position, and in that a time independent activation current loop ("self-holding current loop") for permanent activation of the contact device is closed within said pre-determined period of time by moving said second operating member from said first to a second position.

One preferred embodiment of the method according to the invention is characterized in that as a first measure a charging current loop for charging said a chargeable element (e.g. a capacitor) is closed during a charging time by moving said second operating member to a second position and by keeping the same in this position during said time, and in that the charging current loop is thereafter opened by moving the second operating member to the first position.

In the driver's cabin of a train there is usually an operating member which is called the driver's key, and which is used by the driver when driving the train. The driver's key consists of a personal metal handle for each driver which fits into a recess provided at the driver's stand.

The driver's key may normally be positioned into four different positions, that is:

S—a stop condition in which the handle may be removed from the recess;
B—a drive position in which the locomotive may be moved backwards;
O—a drive position which is a neutral position;

F—a drive position in which the locomotive may be moved forwards.

According to the invention the driver's key is used as said second operating member in which said first position corresponds to the stop position S and said second position corresponds to any one of the drive positions B, O, F. Since according to said preferred embodiment of the invention the driver's key must necessarily be moved first to any one of the positions B, O or F, be kept in this position during said charging time, be returned to the stop position S, and thereafter, after the first operating member has been brought to its second position and is kept in this position, be returned to any one of the positions B, O or F, it is thereby achieved that a given switching-off operation pattern must be followed while using said detachable, specially shaped driver's key. From this it follows that the requirements 2 and 4 are fulfilled most probably. Furthermore, in view of the fact that the driver's key is arranged to influence the permanent activation current loop of the contact device in the manner disclosed, an automatic replacement of the contact device to an initial position is achieved when the driver's key is moved to the position S and eventually detached at the end of a driving trip, which means that the requirement 3 is fulfilled.

A circuit device for carrying out the method according to the invention involves the characteristic features which are evident from the following claims.

According to one characteristic feature of the circuit device according to the invention the contact device is connected in series with a contact which is normally open and which is arranged so as to be closed dependent on an output signal from said checking unit upon the detection of an error in the supervision system, and thereby the requirement 5 above is fulfilled.

The invention will be described in more detail in the following discussion in connection with an embodiment of the circuit device intended for switching-off a velocity supervision system for a train, the circuit diagram of which is shown in the accompanying drawing.

The circuit diagram of the drawing is composed of three schematically shown control current loops A, B and C, which are arranged for the initiation of the respective supervision functions to break the current supply to the engines of the train (A), to initiate a forced retardation (B), and to initiate drive braking (C). The control current loops are provided with the contact pairs R1/1, 3, R1/4, 6 and R1/1, 2, respectively, belonging to the two-way contacts R1/1, 2, 3 and R1/4, 5, 6 of a first relay R1. In referring to the relay contacts, the reference symbols to the left of the slash line identify the relay, whereas the reference numerals to the right thereof refer to the particular contact pairs of said relay. Thus, for example, contact pairs R1/1,3 refers to contacts 1 and 3 of relay R1 having a relay coil R1R. In the position shown of the contacts, the relay R1 is in its normal condition (inactivated condition). The normal condition of the relay R1 means that the control current circuits are intact, and from this it follows that the electronic unit by means thereof may carry out said supervision functions. When the relay R1 is activated the supervision system is switched-off by said contact pairs influencing the control current loops.

In the drawing the relay R1 and the associated contacts are disclosed as being included in the electronic unit EU, the detailed construction of which is not important for an understanding of the invention and which is therefore not described further. This unit is furthermore provided with a voltage source $+V$, $-V$ and a contact S1 which is normally open and which is connected in series with the coil of the relay R1. One terminal of the coil of the relay R1 is connected to the negative terminal $-V$ of the voltage source. The contact S1 is controlled by said checking unit provided in and arranged to perform continuously a function check on the supervision system, the voltage being such that S1 is closed at first when an error is detected in the system.

The electronic unit EU is placed in the engine house of the locomotive and parts included therein and belonging to the circuit device according to the invention are, via the lines CL, connected to the further parts thereof included in the display unit DU of the supervision system, said unit being positioned at the driver's stand in the locomotive. The driver's key K is likewise positioned at the driver's stand.

The last mentioned part of the circuit device is provided with a second relay R2, having a coil with one of its terminals connected to the terminal $+V$ via the line CL1 and the operating make contact S2. The second terminal of this relay coil is connected to the terminal $-V$ via the line CL2. The coil of said relay is connected in parallel with a diode D2, the anode of which is connected to the line CL2.

The driver's key K is coupled to the movable contact element of the operating make contact S2 in a manner such that the contact is closed when the key K is in any one of the drive positions B, O and F shown, and said contact is open when the driver's key is in the position S.

The junction of the coil of the relay R2, the diode D2 and the contact S2 is connected via a current limiting resistor R and a normally closed contact T/1, 2 to one terminal of a capacitor $C_T$. The capacitor is a chargeable element and it has a second terminal connected to $-V$ via the line CL2. The contact T/1, 2 belongs to a push button operated two-way contact T/1, 2, 3 which is of a non-locking type. The fixed contact element T/3 thereof is connected to a fixed contact element R2/2 which is part of a two-way contact R2/1, 2, 3 of the relay R2. The second fixed contact element R2/3 of said two-way contact is connected on the one hand to the fixed contact element R1/3 of the relay R1 via the line CL3 and on the other hand via an indication lamp ATC-B to the voltage source $-V$ via the line CL2. The moving contact element R2/1 is connected to one terminal of the coil of the relay R1 via the contact S1 and the line CL4.

For the circuit device there are two fundamental conditions, i.e. on the one hand the condition in which the normally open contact S1 is open, from which it follows that the circuit device is blocked and that it is impossible to carry out a switching-off operation, and on the other hand the condition in which S1 is closed as a consequence of a detected error in the supervision system, from which it follows that a switching-off may be carried out according to the following:

(a) The driver's key K is moved to the position B, O or F, whereby S2 is closed and capacitor $C_T$ is charged through the charging current loop $+V$, CL1, S2, R, T/1, 2, $C_T$, CL2, $-V$. The capacitor $C_T$ and the resistor R are preferably dimensioned so that K is maintained in this position during at least 10 seconds for the charging of capacitor $C_T$;

(b) The driver's key K is moved to the position S, whereby S2 is opened;

(c) The push button T is depressed and kept in this position, whereby relay R1 is activated through the activation current loop $C_T$, T/1, 3, R2/1, 2, CL4, S1, R1, −V. The activation of R1 is accompanied by the lamp ATC-B being turned on by closing the current loop +V, R1/1, 3, CL3, ATC-B, CL2, −V. The capacitor $C_T$ is dimensioned so that it may supply a holding current to R1 during a given period of time, which may adequately be equal to 5 seconds;

(d) The driver's key K is moved to any one of the positions B, O or F within said period of time, whereby S2 is closed and R2 is activated through the current loop +V, CL1, S2, R2, CL2, −V, and as a consequence thereof R1 will be self-holding through the current loop +V, R1/1, 3, CL3, R2/1, 3, CL4, S1, R1, −V;

(e) The push button T is released.

The coil of the relay R1 is connected in parallel with a diode in series with a resistor, said components being operative to prevent R1 from returning to its normal condition during the lapse of time when R2 is switched during the step d.

From the operation pattern described above a switching-off of the velocity supervision system is achieved, said system being thereafter maintained in a switched-off condition as long as the driver's key K takes one of the drive positions B, O or F. When the driver, after having finished a drive, moves the driver's key to the position S and normally detaches the same, S2 is opened and thereby also the activation current loop of R2. As a consequence thereof the self-holding current loop of R1 is opened, whereby the circuit device is again placed in the initial or start position since R1 will return to its normal condition and therefore the system is switched in again. The replacement of the device to its initial position is indicated by the lamp ATC-B, which is turned off as a consequence of the fact that the current feed is interrupted when the relay R1 returns to its normal condition.

It is obvious to a man skilled in the art that the above-mentioned first and second relays and likewise the two-way switch may equally well be realized by means of known digital circuits. In such an embodiment the time circuit used may for example have the form of a pulse counter provided with an interrupting circuit arranged so as to interrupt the relevant current loop when a given counting condition is reached.

What is claimed is:

1. A circuit device for switching-off a supervision system which provides electronic processing of supervision information supplied thereto and to initiate, dependent on the result of said processing, at least one predetermined supervision function by influencing the operating condition of at least one control loop comprising, first and second operating members having first and second positions, a contact device coupled to said control loop and responsive to said first and second operating members whereby the contact device may be activated to block said supervision function, the contact device including a plurality of individual contact elements connected to said one control loop and arranged to control the control loop so that the associated supervision function is blocked when the contact device is activated, a time controlled activation current loop coupled to the contact device and comprising a time circuit arranged to allow an activation current to be supplied to the contact device during a predetermined period of time, a first contact member responsive to the first operating member and arranged to close the time controlled activation current loop when said first operating member is brought to its second position, and a time independent activation current loop coupled to the contact device and comprising a second contact member in series with one further contact element which conducts a current during said predetermined period of time, said second contact member being connected so as to close the time independent activation current loop when the second operating member is moved to a second position within said predetermined period of time.

2. A circuit device as claimed in claim 1, wherein said contact device comprises a relay having a plurality of contacts constituting said contact elements, wherein the time circuit includes a chargeable element connected in the time controlled activation current loop so as to supply to the relay a current exceeding the holding current thereof during said predetermined period of time, and wherein said further contact element comprises a normally open contact pair of the relay.

3. A device as claimed in claim 2, wherein the second contact member is a part of a two-way switch arranged to close in its normal condition the time controlled activation current loop of the first realy and to close in its activated condition the time independent activation current loop.

4. A device as claimed in claim 2 wherein said first contact member comprises a non-locking two-way switch which is arranged so as to, when not activated, close a charging current loop of the chargeable element which includes a series connected operating make contact connected across a voltage source, and so as to, when activated, close the time controlled activation current loop of the first relay.

5. A device as claimed in claim 3 wherein said two-way contact includes a second relay and further comprising an operating make contact provided in an activation current loop of the second relay whereby said operating make contact is opened in order for the time controlled activation current loop of the first relay to be closed via said two-way switch in its normal condition.

6. A device as claimed in claim 2 further comprising an indication lamp connected to one contact element of the relay, and means for supplying a voltage to said contact element when the relay is activated.

7. A device as claimed in claim 6 wherein the supervision system comprises a velocity supervision system of a train and the device is arranged in the driver's cabin of the train, the second operating member comprises a driver's key which may be positioned in a stop position and in a number of drive positions and is arranged to be operated manually when driving the train, wherein the first position of the second operating member corresponds to said stop position and the second position thereof corresponds to anyone of said drive positions, and wherein said second contact member comprises a second relay having an operating coil, the device further comprising an operating make contact for connecting said second relay coil to a source of voltage, said operating make contact being coupled to the driver's key so that said contact is opened when the driver's key is moved to its stop position and is closed when the driver's key is moved to anyone of its drive positions.

8. A device as claimed in claim 7 wherein said first contact member comprises a non-locking two-way switch and said first operating member comprises a push button member for acting upon said two-way switch, and said indication lamp and said push button member are located at the driver's stand in the driver's cabin.

9. A method of switching-off a supervision system which provides electronic processing of supervision information and to initiate, dependent on the result of said processing, at least one predetermined supervision function by influencing the operating condition of at least one control loop by activating a contact device thereof which is coupled to a pair of operating members for blocking said supervision function, the method comprising, closing a time controlled activation current loop during a predetermined period of time by moving a first of said operating members from a first to a second position thereby to provide a temporary activation of the contact device, keeping the first operating member in this position while a second of said operating members is held in a first position, and closing a time independent activation current loop within said predetermined period of time by moving said second operating member from said first to a second position thereby to permanently activate the contact device.

10. A method as claimed in claim 9 in which said time controlled activation current loop includes a chargeable element, the method further comprising, as a first prior step, closing a charging current loop for charging said element during a charging time by moving said second operating member to a second position and by keeping the second operating member in this position during said charging time, and thereafter opening the charging current loop by moving the second operating member to the first position.

* * * * *